(12) United States Patent
Raguin (10) Patent No.: US 7,164,514 B2
(45) Date of Patent: Jan. 16, 2007

(54) HOLOGRAPHIC DATA STORAGE MEDIA WITH STRUCTURED SURFACES

(75) Inventor: Daniel H. Raguin, Acton, MA (US)

(73) Assignee: DCE Aprilis, Inc., Maynard, MA (US)

( * ) Notice: Subject to any disclaimer, the term of this patent is extended or adjusted under 35 U.S.C. 154(b) by 102 days.

(21) Appl. No.: 10/988,951

(22) Filed: Nov. 15, 2004

(65) Prior Publication Data
US 2005/0105150 A1   May 19, 2005

Related U.S. Application Data (60) Provisional application No. 60/520,176, filed on Nov. 14, 2003.

(51) Int. Cl.
*G03H 1/02* (2006.01)
(52) U.S. Cl. .................... 359/3; 359/566; 359/577; 369/103
(58) Field of Classification Search .............. 359/3, 359/4, 566, 574–575; 369/103
See application file for complete search history.

(56) References Cited

U.S. PATENT DOCUMENTS

| | | | |
|---|---|---|---|
| 5,007,708 A | | 4/1991 | Gaylord et al. |
| 5,621,549 A | | 4/1997 | Redfield |
| 5,917,798 A | * | 6/1999 | Horimai et al. ............ 369/103 |
| 2002/0044356 A1 | * | 4/2002 | Arakawa et al. ........... 359/566 |
| 2002/0089750 A1 | * | 7/2002 | Hoshi ........................ 359/566 |
| 2003/0151814 A1 | * | 8/2003 | Aspen ........................ 359/498 |
| 2004/0042051 A1 | * | 3/2004 | Te Kolste et al. .......... 359/569 |
| 2004/0079114 A1 | | 4/2004 | Aitken et al. |

OTHER PUBLICATIONS

Bernhard, C., Structural and functional adaptation in a visual system, Endeavor 26, pp. 79-84 (1967).

Clapham, P. et al., Reduction of Lens Reflexion by the "Moth Eye" Principle, Nature, vol. 244, pp. 281-282 (1973).

Hutley, M., Coherent Photofabrication, Optical Engineering, vol. 15, No. 3, pp. 190-196 (1976).

Wilson, S. et al., The optical properties of 'moth eye' antireflection surfaces, Opt. Acta 29, pp. 993-1009 (1982).

Moharam, M. et al., Diffraction analysis of dielectric surface-relief gratings, J. Opt. Soc. Am., vol. 72, No. 10, pp. 1385-1392 (1982).

Ono, Y. et al., Antireflection effect in ultrahigh spatial-frequency holographic relief gratings, Applied Optics, vol. 26, No. 6, pp. 1142-1146 (1987).

(Continued)

*Primary Examiner*—Leonidas Boutsikaris
(74) *Attorney, Agent, or Firm*—Kenneth J. LuKacher (57) ABSTRACT

Holographic media for storing and reading holographic data is provided having one or more external or internal surfaces having structures for at least one of minimizing reflections from illumination incident the surface, or enhancing adhesion between surfaces within the media. Structures for minimizing reflections represent a grating pattern of sub-wavelength structures providing low reflectivity at the operating characteristics of holographic optical systems to use the media, such as spectral bandwidth, angular bandwidth, and polarization of illumination incident the media. Adhesion promotion may be provided by structures along an interior surface of the media, such as along an interfacing surface between photosensitive material of the media and a substrate material adjoining the photosensitive material. Such adhesion promotion may be provided by such structured surface with or without providing low reflectivity at the operating characteristics of holographic optical systems to use the media. The structures may be same or similar to one-, two-, or three-dimensional sinusoidal, triangular, staircase, moth eye, pyramidal, lamellar, or binary structures, or combinations thereof, and may be periodic or random.

40 Claims, 5 Drawing Sheets

OTHER PUBLICATIONS

Raguin, D. et al., Antireflection structured surfaces for the infrared spectral region, Applied Optics, vol. 32, No. 7, pp. 1154-1167 (1993).

Grann, E. et al., Optimal design for antireflective tapered two-dimensional subwavelength grating structures, J. Opt. Soc. Am., vol. 12, No. 2, pp. 333-339 (1995).

InPhase Technologies, what is holographic storage?, Website at http://www.inphase-technologies.com/technology/, Nov. 3, 2004.

Aprilis, Inc., Aprilis Write Once Holographic Media HMD120, HMC050, Copyright 2002.

Enger, R. et al., Optical elements with ultrahigh spatial-frequency surface corrugations, Applied Optics, vol. 22, No. 20, pp. 3220-3228 (1983).

Micro-Optics: Elements, Systems, and Applications, ed. by H.P. Herzig (Taylor & Francis, Inc. Bristol, PA) 1997.

* cited by examiner

HOLOGRAPHIC DATA STORAGE MEDIA WITH STRUCTURED SURFACES

This Application claims priority to U.S. Provisional Patent Application No. 60/520,176, filed Nov. 14, 2003, which is herein incorporated by reference.

FIELD OF THE INVENTION

This invention relates to holographic data storage media having one or more structured surfaces, and particularly to, holographic data storage media having one or more surfaces with structures for one of suppressing reflections when such media is operated upon in holographic data storage systems, or enhancing surface adhesion of adjoining materials within the holographic media, or for both suppressing reflections and enhancing adhesion.

BACKGROUND OF THE INVENTION

Figure 1:
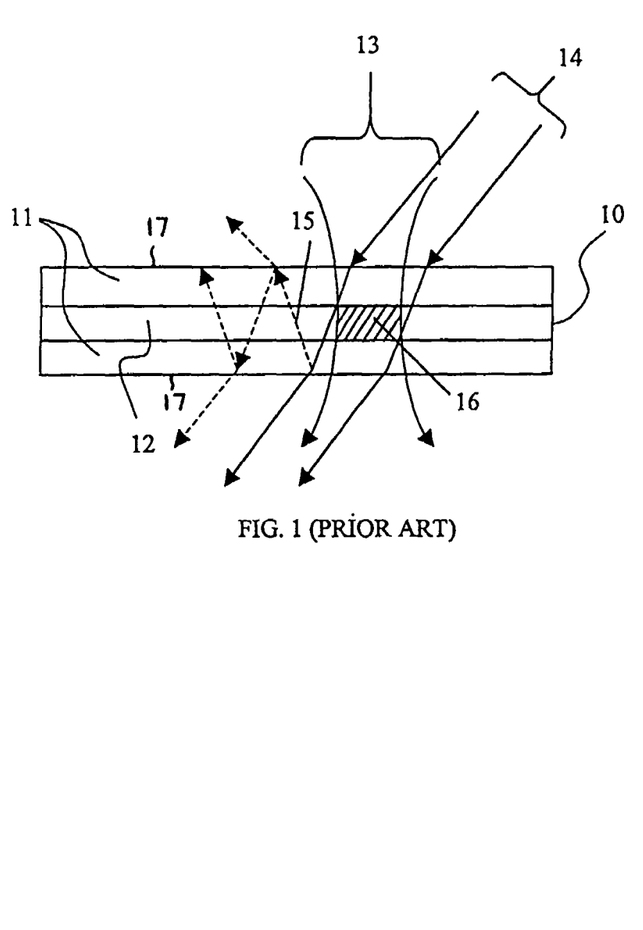
FIG. 1 is a cross-section of holographic data storage media of the prior art along a holographic recording plane to show that spurious reflections within the media can expose material outside of the area of interest in the media.

In holographic data storage systems (HDSS), a reference beam and an object beam are coincident upon a media suitable for holographic recording. For maximum fringe visibility in the interference fringes produced, these two beams preferably have polarization vectors that are substantially parallel to each other. In most HDSS, this condition requires that the polarization vectors are perpendicular to the plane of incidence defined by the holographic media and are described to be TE-polarized. In order to record multiple co-locational holographic pages in a single location of a holographic media, one multiplexes using a variety of techniques including angle, peristrophic, shift, and/or speckle. Typically in a HDSS, high numerical aperture optics are used for the object beam in order to maximize the achievable storage capacity, and, consequently, high incident angles are required for the reference beams. For page-based optical systems (e.g., holographic optical systems that use spatial light modulators and detectors containing one-dimension (1-D) or two-dimensional (2-D) arrays of pixels), one has a relatively large optical area on the holographic media (few hundred microns) compared to a bit-based system (submicron), such as is the case of DVD and CD devices. Therefore, the energy densities where the recording takes place in a DVD and CD media is significantly higher for the same power laser as compared to the energy densities in the media of a page-based HDSS. In the case of DVD and CD recordable material, there is a thermal threshold below which no recording takes place and above which recording can take place. Therefore, scattered light (which is of significantly lower intensity compared to the primary focused spot of the DVD or CD optical system) within a DVD or CD device cannot record erroneous bits in the phase-change material of a DVD or CD. For holographic media, however, materials such as those comprising photopolymerizable reactants do not behave in such a non-linear fashion due to the photointitiation process, and thus can be highly sensitive to scattered or stray light during the holographic recording process. Such reflected scattered or stray light can undesirably expose the holographic media outside the intended exposure area, thereby using up some of the recordable dynamic range of the holographic media. This problem is illustrated in FIG. 1, which represents a cross section of a holographic media 10 along the recording plane as may be the case of an angle-multiplexing HDSS. The holographic media 10 is composed of two substrates 11 that sandwich the photosensitive material 12, as is the case of holographic photopolymerizable materials that are commercially available. An object beam 13 and a reference beam 14 interfere within the photosensitive material and record a hologram in an area 16 represented by the hash marks. A number of rays N of the reference beam, however, also reflect at the substrate-to-air interface, and, consequently, the reflections, depicted in FIG. 1 by the light 15 contained in this ray (and reflecting multiple times as represented by the dashed lines) will expose additional photosensitive material outside of the intended exposure area 16. Such reflections are referred to as Fresnel reflections.

The conventional manner to suppress Fresnel reflections is through the use of thin-film coatings. These antireflection (AR) coatings are typically multi-layer and can be designed for a general material interface, angles of incidence, polarizations, and spectral bandwidth. At least one and preferably two external surfaces 17 of the holographic media containing the holographic material are AR-coated. For example, such AR coated holographic media is sold by Aprilis, Inc. of Maynard, Mass., U.S.A., and U.S. Published Patent Application No. US 2003/0151814, published Aug. 14, 2003, describes the use of AR coatings on holographic media. Although useful for reducing stray or scattered light, they require a thin-film layering process which can have problems with adhesion and thermal expansion mismatches with the media surfaces they are applied to. Further, AR coatings are difficult to apply when such substrates of the media are of plastic, such as polycarbonate. Consequently, an alternative to the use of thin-film coatings is desirable.

Subwavelength structured (SWS) surfaces can be designed for anti-reflection, and is referred to hereinafter as anti-reflection structured (ARS) surfaces. Typically, ARS surfaces contain surface-relief gratings that impedance matches two media where one is a solid, and the other a gas, liquid, or solid. By structuring a surface with a subwavelength-period pattern (either through etching, embossing, or other techniques), an index of refraction distribution can be synthesized so that surface reflections are minimized. When designed properly, these structures can operate over large spectral bandwidths and fields of view. Because foreign materials are not being added to the substrate surface, problems commonly encountered in thin-film technology, such as adhesion and thermal expansion mismatches, are non-existent in the design of these structured surfaces.

Although relatively a new technology, ARS surfaces can be found on the cornea of certain night-flying moths. See, C. G. Bernhard, "Structural and functional adaptation in a visual system," Endeavor 26, 79–84 (1967). The subwavelength structures of the moth's cornea reduce surface reflections which would otherwise betray the moth's position to its predators. Investigations in ARS surfaces for applications in the visible or near-IR portion of the spectrum have replicated moth-eye surfaces. See, P. B. Clapham and M. C. Hutley, "Reduction of lens reflexion by the 'moth eye' principle," Nature (London) 244, 281–282 (1973), M. C. Hutley, "Coherent photofabrication," Opt. Eng. 15, 190–196 (1976); and S. J. Wilson and M. C. Hutley, "The optical properties of 'moth eye' antireflection surfaces," Opt. Acta 29, 993–1009 (1982). These moth-eye structures are an array of 2-D structures that are approximately sinusoidal in shape. Non moth-eye ARS surfaces have also been investigated. See, M. G. Moharam and T. K. Gaylord, "Diffraction analysis of dielectric surface-relief gratings," J. Opt. Soc. Am. 72, 1385–1392 (1982); Y. Ono, Y. Kimura, Y. Ohta, and N. Nishida, "Antireflection effect in ultrahigh spatial-frequency holographic relief gratings," Appl. Opt. 26, 1142–1146 (1987); U.S. Pat. No. 5,007,708, issued Apr. 16, 1991; and D. H. Raguin and G. M. Morris, "Antireflection structured surfaces for the infrared spectral region," Appl. Opt. 32, 1154–1167 (1993). In U.S. Pat. No. 5,007,708, the ARS surfaces described are limited to having binary or staircase profiles. Although ARS surfaces have been proposed by the above literature, they have not been incorporated into holographic data storage media with surface profiles as set forth in the present invention.

Figure 2:
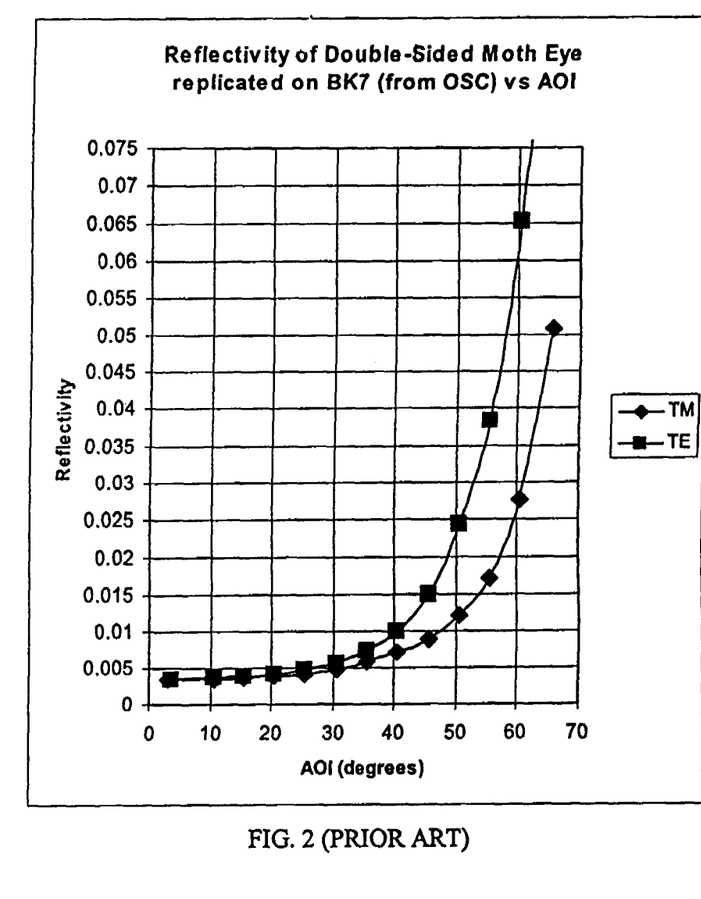
FIG. 2 is a graph of reflectivity versus angle of incidence (AOI) of a moth eye structure of grating period 260 nm that was replicated into index-matching polymer on both sides of a BK7 substrate.

FIG. 2 illustrates the reflectivity of a moth eye structure produced by Optical Switch Corporation of Bedford, Mass. for use in a window or screen over an electronic display. The structure had a 260 nm grating period and was replicated (cast-and-cure) into an index-matching polymer on both sides of a BK7 substrate. The figure illustrates the measured double-sided reflectivity of the substrate as a function of angle of incidence (AOI) for both TE and TM polarizations of a 532 nm double-YAG laser. The reflectivity is extremely low and for this particular moth eye design can be reduced to below 0.5% for TE polarization out to about 54°.

Although all holographic media are not composed of multiple distinct materials, current photopolymers marketed for holographic data storage require the sandwiching, as illustrated in FIG. 1, of the photopolymer between two substrates that may be glass or plastic, such as sold by InPhase Technologies of Longmont, Colo., U.S.A., and Aprilis, Inc. of Maynard, Mass., U.S.A. Since several different materials are contained within the holographic media, one requires that the materials bond sufficiently well together, in addition to having means by which Fresnel reflections are suppressed at the various material interfaces (both external and internal) that comprise the holographic media.

SUMMARY OF THE INVENTION

It is an object of the present invention to provide improved holographic data storage media having one or more structured surfaces for reducing Fresnel reflections.

It is another object of the present invention to provide improved holographic data storage media having one or more structured surfaces which enhance adhesion of the adjoining materials contained in the media.

Briefly described, holographic data storage media embodying the present invention has one or more external or internal surfaces having structures for one of minimizing reflections from illumination incident the surface, or enhancing adhesion between surfaces within the media, or for minimizing reflection and enhancing adhesion. The structures may represent a grating pattern of one-, two-, or three-dimensional sinusoidal, sinusoidal, triangular, moth eye, staircase, pyramidal, lamellar, binary structures, or combinations thereof, or of structures similar thereto. Such holographic media can be used in holographic data storage systems having optics for reading and writing upon such media.

The media of the present invention has a photosensitive material (e.g., photopolymer) capable of being holographically recorded upon. In one case of the media, the photosensitive material lies between two substrates (e.g. glass or plastic, such as polycarbonate or other polymer) that adjoin or encapsulate the photosensitive material. In one embodiment of such media, structures are provided on an external surface of one or both substrates. In another embodiment of such media, structures are provided on an external surface of another material applied to the external surface of one or both substrates.

For the case of media having photosensitive material that does not require encapsulation between substrates, for example photorefractive crystals, such as LiNbO$_3$, the media in a further embodiment may have the structures patterned directly into the surface of the photosensitive material along one or more sides thereof. In still another embodiment of the media, structures may be provided on both external and internal surfaces of the media, such as along one or both external surfaces of the substrates and along one or both surfaces of the photosensitive material facing such substrates. Patterning of the structures onto a surface may be by etching, molding, but preferably, the structures are provided through a low-cost method, such as replication.

The structured surfaces for reducing reflection are referred to herein as anti-reflection structured (ARS) surfaces. Such structures of the ARS surfaces provide a grating pattern of subwavelength structures having low reflectivity at the operating wavelength(s), or spectral bandwidth, of the HDSS to use the media, and may also have low reflectivity at other operating HDSS characteristics, such as angular bandwidth (i.e., range of angle of incidence), and polarization (e.g., S, TE, or TM polarization). For an angle-multiplexed HDSS, it is preferential that such structures suppress reflections for high incident angles (e.g., 30° to 70°) and for TE-polarized light. Structures may be periodic, aperiodic, or random. The structures may, for example, contain the same or a mix of different structures (e.g., sinusoidal, triangular, moth eye, staircase, pyramidal, lamellar, binary, or structures similar thereto) with areas of different periodicity and/or degrees of randomness.

Such structured surfaces may also provide increased surface area for adhesion promotion between two or more distinct materials that may be required within a holographic media. For the case described earlier of a photosensitive material capable of holographic data storage that requires encapsulation by a substrate, the encapsulating surface may be patterned with the structures in order to promote adhesion between the substrate and the photosensitive material. If the indexes of refraction of the two materials being adhered together are similar enough such that there is low reflectivity at the boundary between them, then the profile of the surface structure used to promote surface adhesion can take multiple forms. For example, the surface can be periodic or random, one-dimensional or two dimensional, or any combination thereof. When surfaces do not require ARS structures that preferentially have subwavelength features, surfaces for adhesion when the index match is very close (e.g., the index difference $\Delta n$ is within 0.06) may have features that can be appreciably larger than the wavelength(s) of operation upon the holographic media.

For the case of a holographic media containing two or more materials that must be adhered and whose index of refractions are appreciably different, then the structures for the surface for adhesion of these two or more materials may also provide suppression of Fresnel reflections at the boundary between the materials for the spectral bandwidth, angular bandwidth, and polarizations that an HDSS using the media would be subjecting the boundaries to.

BRIEF DESCRIPTION OF THE DRAWINGS

The foregoing objects, features and advantages of the invention will become more apparent from a reading of the following description in connection with the accompanying drawings, in which.

DETAILED DESCRIPTION OF THE INVENTION

Referring to FIGS. 3–6, different embodiments of the present invention are shown for applying structures to surfaces of holographic data storage media. In these figures, and other following figures showing surfaces with ARS structures, the scale of the structures has been exaggerated for purposes of illustration. The holographic media with such structured surfaces may be used in holographic data storage systems (HDSS). Such an HDSS is shown, for example, in U.S. Pat. No. 5,621,549. The ARS surfaces are applicable to holographic media which may be in disk, card, coupon or other media shape or volume formats. As such, these figures only depict cross-sectional views along one side of the media. The structured surfaces of the media are one- or two-dimensional, and have a depth into the surface along a third dimension. The structured surfaces presenting ARS surfaces have subwavelength surface features having anti-reflection optical properties. Such ARS surfaces represent surface-relief gratings, that impedance match the material upon which they are formed with another, such as a gas (or air) when the ARS surface is an external surface of the media, or a solid for an internal surface in the media. By structuring a surface with a subwavelength-period pattern (either through etching, embossing, or other techniques), an effective index of refraction distribution is synthesized so that surface reflections are minimized. The ARS surface is optimized for a media for use in accordance with the operating optical parameters of the HDSS to use the media for storing holographic data. Such optical parameters include, for example, wavelength(s) of operation (spectral bandwidth), range of angle of incidence (angular bandwidth), and polarization of incident light by such object and reference beams of the HDSS. Depending on such operating parameters of wavelength(s) and range of angle of incident, the ARS structures may operate over large spectral bandwidth and fields of view.

Figure 3:
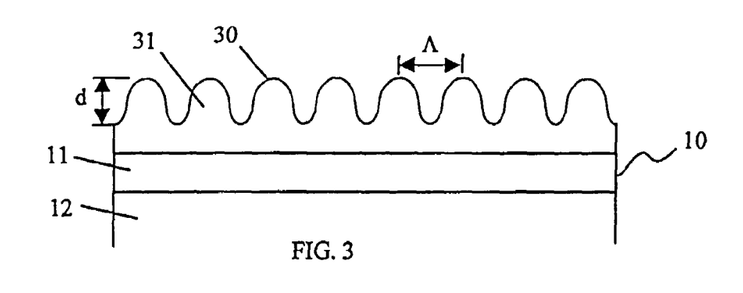
FIG. 3 is a cross-sectional view of one side of the holographic media of a first embodiment of the present invention having an external surface with an ARS surface, where such patterned external surface is along a material of the media that is different from the substrate that encapsulates the photosensitive material of the media.

FIG. 3 shows a first embodiment of holographic media 10 in which an ARS surface 30 is applied to an external surface of the holographic media 10 such that it is placed on top of the substrate 11 adjoining or encapsulating the photosensitive material 12 of the media. The substrate 11 may be of glass, or plastic, such as polycarbonate or other polymer materials. For example, the substrate may be 0.6 mm thick, and the photosensitive material 0.5 mm thick. This ARS surface 30 is fabricated from a material 31 that is different from the substrate 11, but preferentially has an index of refraction that approximately matches in order to minimize reflections at that surface.

Figure 4:
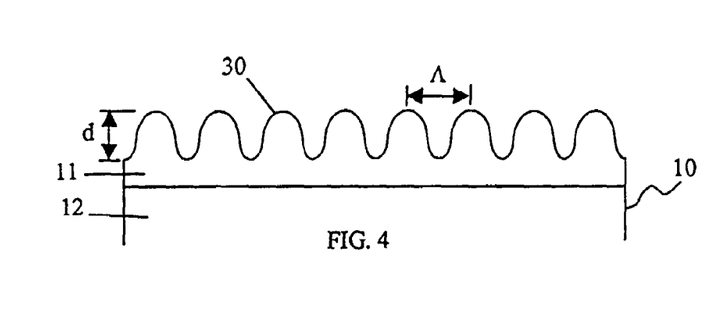
FIG. 4 is another cross-sectional view of one side of a holographic media of a second embodiment of the present invention having an external surface patterned with an ARS surface, where such patterned external surface is along a material of the media that is the substrate adjoining the photosensitive material of the media.
Figure 5:
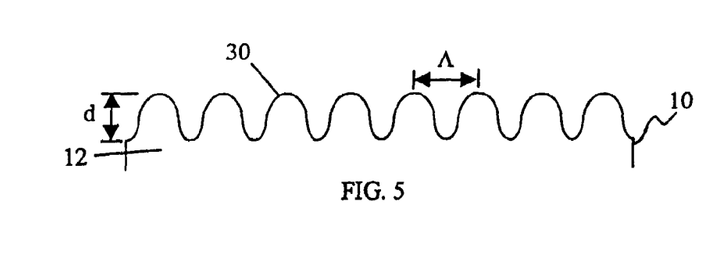
FIG. 5 is another cross-sectional view of one side of a holographic media of a third embodiment of the present invention having an external surface patterned with an ARS surface, where such patterned external surface is directly in the photosensitive material of the media.

The structures of the ARS surface may be on other external surfaces as shown in FIGS. 4 and 5. FIG. 4 shows a second embodiment of holographic media 10 in which an ARS surface 30 is applied directly into the substrate 11 that adjoins photosensitive material 12 of the media. FIG. 5 shows a third embodiment of holographic media 10 in which the ARS surface is applied directly (or patterned) into the photosensitive material 12. For example, moldable chalcogenide material, such as that developed by Polight (Polight Technologies Ltd., Cambridge, England), may be used in this embodiment to form the ARS surface, see also Aitken et. al., United States Patent Application No. 2004/0079114, published Apr. 29, 2004, or U.S. patent application Ser. No. 10/283,402, filed Oct. 29, 2002, entitled "Low-Temperature Fabrication of Glass Optical Components". In another example, $LiNbO_3$ or other photorefractive materials suitable for holographic recording can be patterned with ARS surfaces, via photolithographic and etching processes. However other photopolymer materials capable of being patterned with an ARS surface may also be used. The ARS surfaces 30 of media 10 of FIGS. 3–5 may be achieved by having structures with a lateral dimension, $\Lambda$, that is smaller than the operation wavelength(s) of the HDSS, and in general the depth d is smaller or on the order of the incident wavelength.

Figure 6:
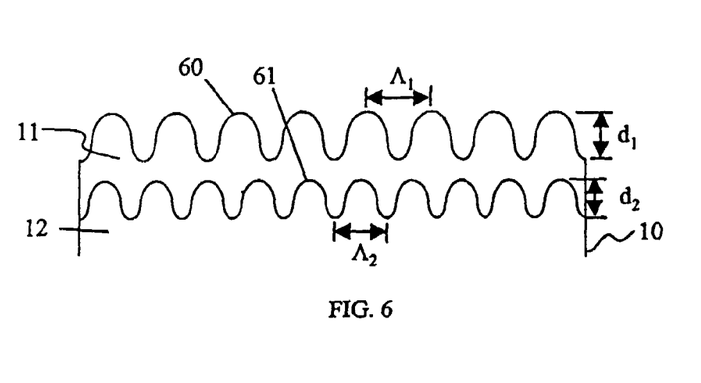
FIG. 6 is another cross-sectional view of one side a holographic media of a fourth embodiment of the present invention having an internal surface and an external surface both patterned with an ARS surface.

The ARS structures may be applied to both an external surface, as well as an internal surface of the holographic media 10. For example, FIG. 6 shows a fourth embodiment of holographic media 10 in which an ARS surface is provided on an external surface 60 on substrate 11, and another ARS surface is provided on an internal surface 61 on the photosensitive material 12 of the media. The grating period $\Lambda_1$ and depth $d_1$ of the ARS features of the external surface 60 need not match those ($\Lambda_2$ and $d_2$, respectively) of the ARS features of the internal surface 61. The ARS surfaces of FIG. 6 may be achieved by having structures with orthogonal dimensions $\Lambda_1$ and $\Lambda_2$ that are smaller than the operation wavelength(s) of the HDSS, and in general the depth d is smaller or on the order of the incident wavelength.

As an illustrative example of the holographic media 10 of the fourth embodiment, consider the case in which the media has a photosensitive material suitable for holographic recording is to be encapsulated with another material. If the index of refraction of the photosensitive material is different from the material encapsulating it, light will reflect off of this boundary. To suppress such reflections, this fourth embodiment covers the case in which one or more of the internal surfaces (such as the boundaries between two materials) are patterned with an ARS to suppress reflections inside of the holographic media.

In FIGS. 3–6 only one side of the holographic media is shown and the sides are illustrated as being essentially flat. This invention is not restricted to such planar embodiments of holographic media, but applies to other forms, such as, cubical, spherical, and cylindrical. Further, on any of the other sides of a holographic media, there is another ARS surface (or no ARS surface) that may have the same or different structures from the ARS surface of the first side.

Figure 7A:
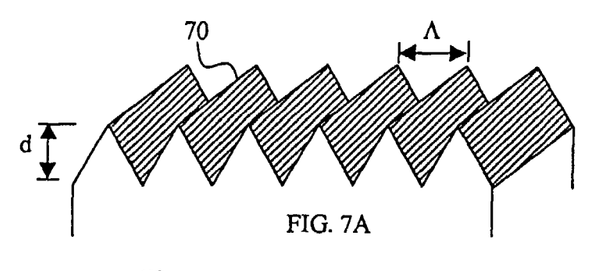
FIG. 7A is an example of a patterned ARS surface of triangular structures which may be used in the holographic media of the embodiments of FIGS. 3–6.
Figure 7B:
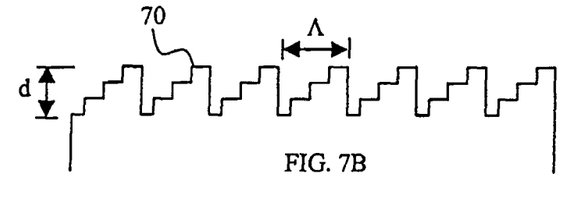
FIG. 7B is an example of a patterned ARS surface of staircase structures which may be used in the holographic media of the embodiments of FIGS. 3–6.
Figure 7C:
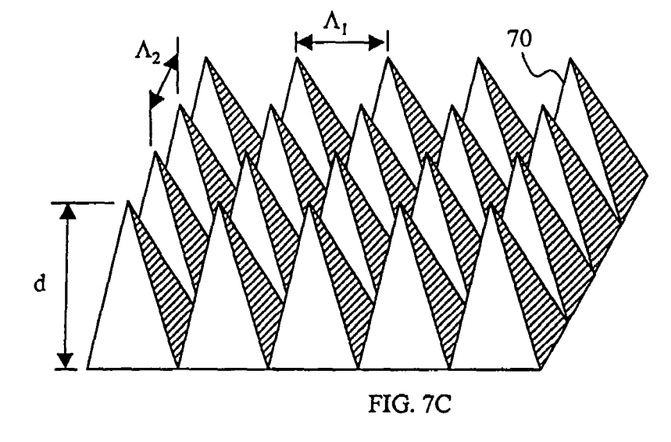
FIG. 7C is an example of a patterned ARS surface of pyramidal structures which may be used in the holographic media of the embodiments of FIGS. 3–6.

Although structures with approximately sinusoidal cross-sections for the ARS surface are shown in FIGS. 3–6, such structures may be sinusoidal-like structures which are not actually sinusoidal in shape, or may be of other periodic profiles than sinusoidal or sinusoidal-like. For example, the ARS surface may have structures having profiles that are triangular as shown in FIG. 7A, staircase as shown in FIG. 7B, pyramidal as shown in FIG. 7C, or lamellar. Similarly, like structures which are not actually triangular, staircase, pyramidal, or lamellar may also be used. Further, the steps of the staircase structure although shown in FIG. 7B as having equal step sizes may have different step sizes. These profiles, for example, can be 1-D (e.g., FIG. 7A) or 2-D (e.g., FIG. 7C) regular profiles or can be 1-D or 2-D random or pseudo random profiles that exhibit AR properties at the operating wavelength of the HDSS. Although these profiles are described as 1-D or 2-D, they have depth which provides a 3-D profile. Also, although a single material 11 is depicted as separating the photosensitive material 12 and the material containing the ARS surface 31, any number of materials can separate the two, which can have an ARS surface. For 2-D structures, the feature dimensions (period) $\Lambda_1$ and $\Lambda_2$ may be the same or different in each dimension.

Different methods of fabricating the ARS surfaces of media 10 may be used, all of which require first fabricating a patterned surface in a suitable material. Once a substrate material has been selected and a substrate with said material has been obtained, the surface of such substrate can be patterned using processes that include coating the substrate with photoresist and then performing photolithography, holography, laser writing, or e-beam lithography to pattern the photoresist layer. Such processes, for example, are described in Micro-Optics: Elements, Systems, and Applications, ed. by H. P. Herzig (Taylor & Francis, Inc. Bristol, Pa., 1997). The photoresist can be etched-transferred into the underlying substrate, via etching methods as aqueous chemical etching or dry etching processes, such as ion milling, reactive ion etching, chemically assisted ion beam etching, or reactive ion beam etching. The remaining photoresist is removed from the surface and additional photoresist and etching steps can be conducted if required to achieve the final structure. The etched structure can serve as the final product, if the substrate material initially selected is the photosensitive material or one of the substrate materials encapsulating the photosensitive material. The preferred embodiment is to use the etched substrate material as part of the process required to form a mold tool with which to replicate the required surface onto the portion of the holographic media required. For example, the etched substrate can be used as the mold tool directly or the etched substrate can be used to form the mold tooling by nickel electroforming. If the mold tooling is to be fabricated via an electroforming process, such tooling may also be fabricated directly from a photoresist pattern and can bypass the etching process described earlier. Once a suitable mold tool is created, its surface may be treated with a chemical or material that will act as a release agent during the molding process. Depending upon the material being molded, replication techniques that can be used to create the final ARS surface include, by way of example, hot embossing, injection molding, compression molding, compression injection molding, and cast-and-cure. A replicated material may also be used (for example, a polymer material) with an ARS surface on another substrate as an etch mask. The replicated surface can then be transferred into the underlying surface via etching.

Although the ARS surfaces, may be patterned or etched, the preferred method for fabricating ARS surfaces is through a low-cost method of replication, and in particular using a polymer material through a cast-and-cure method, wherein the polymer film is cast with the required structure that exhibits anti-reflection properties onto one or more of the external surfaces of a holographic media. The polymer material is preferably ideally index-matched to the material it is replicated onto so that there is minimal reflection at that interface. Other methods of forming structured surfaces of the media 10 along one or more of its external surfaces may be by direct molding (by way of example, hot embossing, injection molding, or compression injection molding).

When one or more of the external surfaces of the holographic media is a polymer surface, the surface may be molded with the required ARS surface. Polycarbonate (PC) is one example of a suitable polymeric material, since PC disks are fabricated in volumes of hundreds of millions per year for CDs and DVDs and are already molded with the pit and groove structure required for these storage devices. PC disks, coupons, or other shaped media suitable for an HDSS can be molded with the ARS surface. Other suitable polymeric materials that are also available and can be used for substrates include, by way of example but are not limited to, cyclic olefin copolymers, such as Zeon Zeonur 1020R or Ticona Topas 5013, acrylates, such as Acrylic VOD (Atofina, now called Arkema Group, France), and methacrylates, such as polymethylmethacrylate (PMMA). For holographic disk media that uses photopolymerizable material(s) as the recording media, the bounding substrates of the media can be PC or other suitable polymeric substrates with molded ARS surfaces. This is particularly advantageous in that the AR coating for the surface does not require a separate step but can be accomplished when the disk itself is molded. Also, AR coatings using thin films tend to be problematic if they are required to operate over a broad angular range on PC or other polymeric substrate materials, since plastic is more difficult to coat then glass or other substrate materials.

The methods and processes described in the previous paragraph can be used to fabricate a variety of ARS surfaces for holographic data storage applications. For example, ARS surfaces may be molded directly in polycarbonate or other suitable polymer substrate material of holographic media 10 of FIGS. 3, 4, and 6, or patterned on the surface of $LiNbO_3$ or other photosensitive (photorefractive) material suitable for holographic data storage of FIGS. 5 and 6, or molded on the surface of a chalcogenide glass substrate that is used for holographic data storage. The methods and process described in the previous paragraph can be used to achieve a variety of surface-relief structures.

Figure 8A:
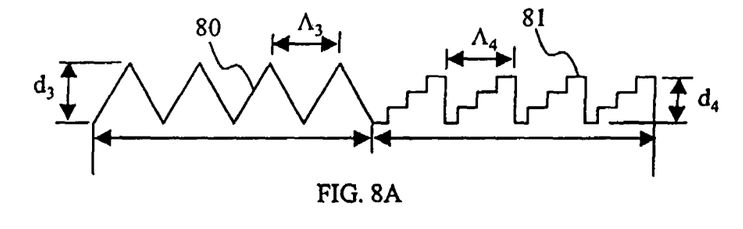
FIGS. 8A, 8B, and 8C are further examples of ARS surfaces that contain more than one series of periodic structured surfaces (FIG. 8A), surfaces in which the periodicity of the structure spans numerous surface-relief features (FIG. 8B), and surfaces that contain random structures (FIG. 8C), which may be used in the holographic media of the embodiments of FIGS. 3–6.
Figure 8B:
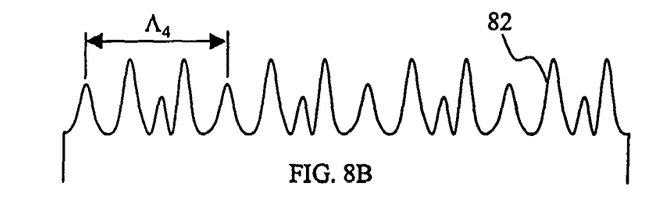
Figure 8C:
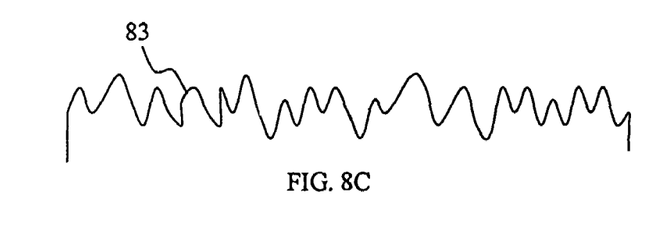

FIGS. 8A–8C show other ARS surfaces having different profiles. FIG. 8A depicts an ARS surface that contains a collection of more than one structure type. As depicted, the surface contains two periodic sets of periodic structures, one triangular surface structure 80 with period $\Lambda_3$ and depth $d_3$, and one stair-stepped surface structure 81 with period $\Lambda_4$ and depth $d_4$. The depicted surface is an illustrative example and in general a plurality of periodic structures can be fabricated and the mix of periodic structures can occur in one or more dimensions across the surface. For example, if x and y are orthogonal axes along a surface, a profile may be periodic along the x or y axis, or along both the x and y axes, or in combination with another axis, such as in a hexagonal array structure which may be periodic in three directions along a surface. FIG. 8B depicts an ARS surface 82 in which multiple features are present within one region of periodicity. As depicted, there are four structures within one region of periodicity $\Lambda_4$. In two dimensions areas of periodicity can be constructed in which multiple features lie within them. FIG. 8C depicts an ARS surface in which the surface has random structures. The randomness of the structure can be achieved via a variety of process, such as holographic recording of laser speckle, or by an etching process that selectively etches one or more components from a multi-component material. Preferably, the random structure has a correlation length of the surface randomness shorter than the wavelength(s) of HDSS operation, such that scattering from the random structure is minimized.

Figure 9:
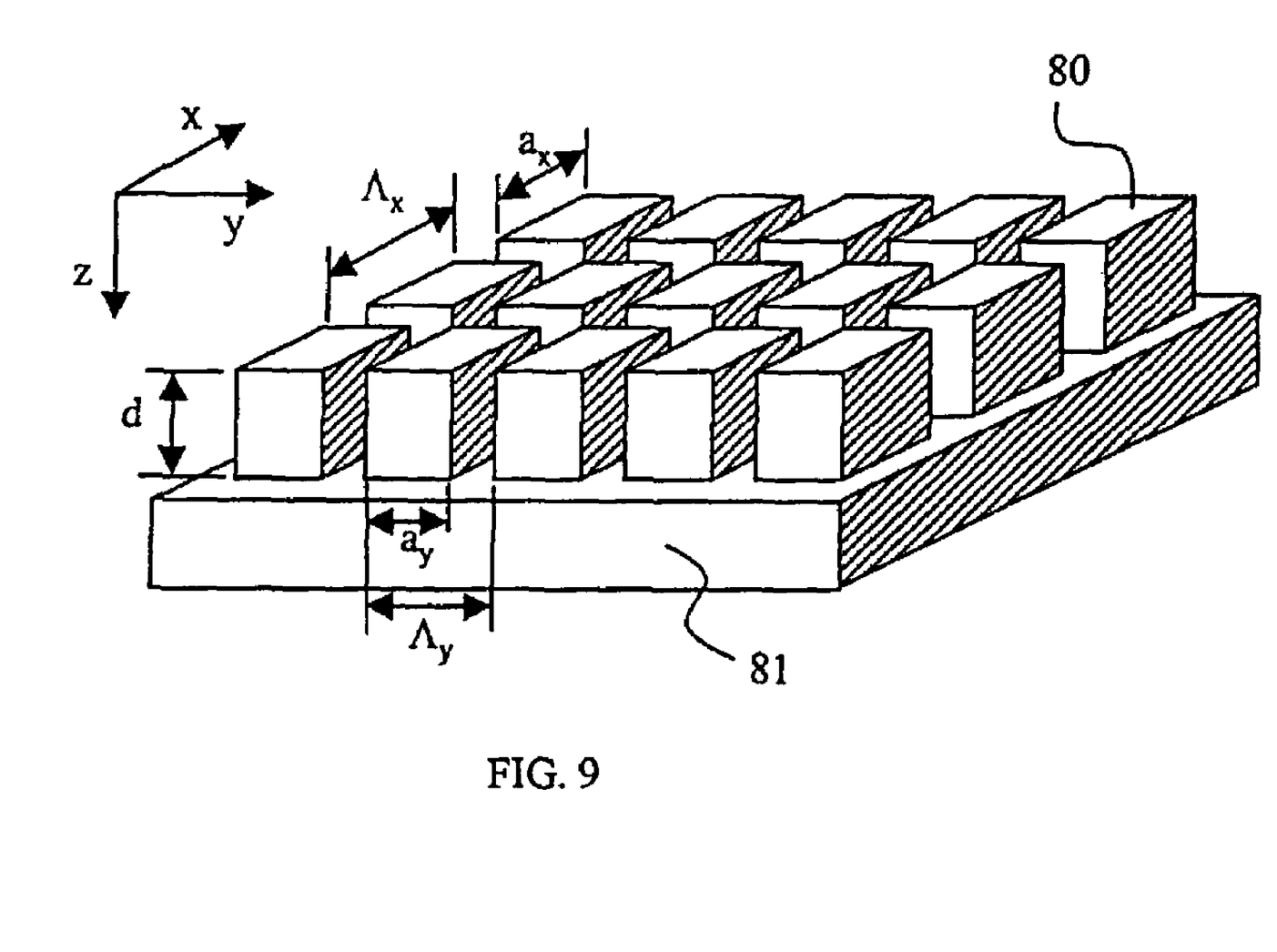
FIG. 9 is an example of an ARS surface having structures comprising of a periodic 2-D array of binary features, which may be used in the holographic media of the embodiments of FIGS. 3–6.

FIG. 9 shows an example of a 2-D binary ARS profile that is patterned on one of the materials 81 of a holographic media. The ARS has binary features 80 that have a periodicity of $\Lambda_x$ and $\Lambda_y$ in the x and y directions, respectively.

An ARS surface is designed by preferentially setting the grating period of the structure such that no orders propagate in the holographic media other than the zeroth order according to $$\Lambda < \frac{\lambda}{n_t + n_i \sin\theta_i}, \quad (1)$$

where $\lambda$ is the free-space wavelength, $\Lambda$ is the grating period, $n_i$ and $n_t$ are the indices of refraction of the incident and transmitting media, respectively, and $\theta_i$ is the angle of incidence in the incident medium as measured with respect to the surface normal of the boundary between the two materials. ARS surfaces with 2-D profiles, e.g., cross gratings and moth eye structures, are preferential when the HDSS requires low reflectivity for both TE and TM polarizations. For the specific case of an ARS with a binary structure, one starts the vector diffraction design, such as described in M. G. Moharam and T. K. Gaylord, "Diffraction analysis of dielectric surface-relief gratings," J. Opt. Soc. Am. 72, 1385–1392 (1982), using a seed depth d of $$d = \frac{\lambda}{4\sqrt{n_i n_t}}, \quad (2)$$

For 2D profiles that are continuous in profile, see E. B. Grann, M. G. Moharam, and D. A. Pommet, "Optimal design for antireflective tapered two-dimensional subwavelength grating structures," J. Opt. Soc. Am. A 12(2), 333–339 (1995).

Figure 10:
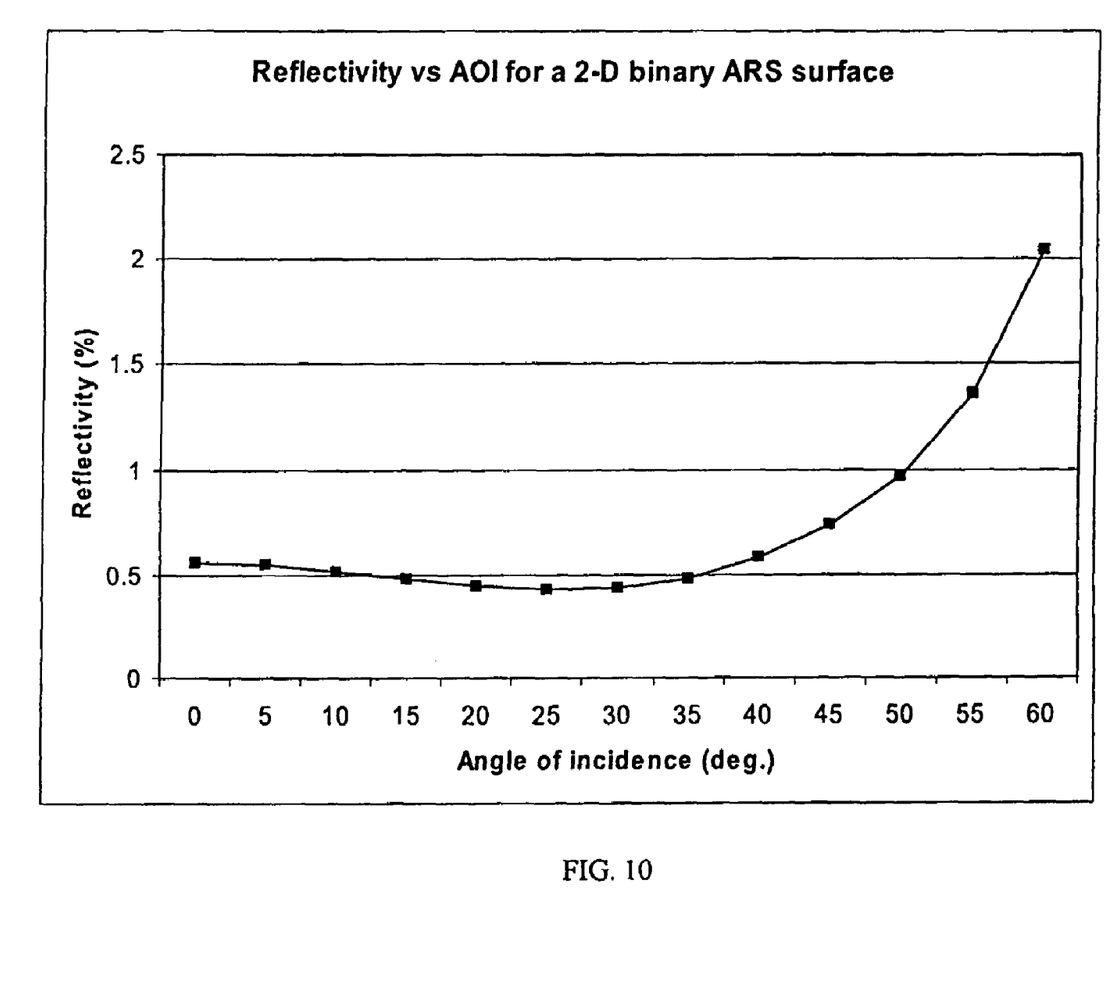
FIG. 10 is a graph of reflectivity versus angle of incidence (AOI) for TE and TM polarized illumination at a wavelength of 532 nm off of a 2-D binary ARS surface, such as shown in FIG. 9.

As an example of an ARS surface, consider a HDSS operating at 532 nm. Consider also that this HDSS operates with holographic media that is comprised of two polycarbonate (n=1.59) substrates that sandwich a holographic material. Further, consider that a binary 2-D ARS surface is desired having air-to-polycarbonate reflections are suppressed for TE and TM polarizations from normal incidence to an angle of incidence in air of about 50°. Using vector diffraction model one obtains the reflectivity performance versus angle of incidence (AOI) in air depicted in FIG. 10 for the ARS surface profile parameters of $\Lambda_x=\Lambda_y=0.200$ μm, d=0.127 μm, and $a_x/\Lambda_x=a_y/\Lambda_y=50\%$, where $\Lambda_x$ and $\Lambda_y$ is the grating period in the x and y dimensions, respectively, and $a_x$ and $a_y$ is the amplitude (or width) of each structure in the x and y dimensions, respectively, and d is the depth of the structures, as illustrated for example in FIG. 9. For example, such an ARS surface can be molded into the polycarbonate surface directly when the substrate itself is molded. In comparison, the reflectivity of a bare polycarbonate surface in air will reflect TE-polarized light with a reflectivity of 5.2% at normal incidence to a 20.7% reflectivity at 60°.

For the case of structure surfaces for the application of increasing adhesion between two or more materials within a holographic media, any of the structures shown in FIGS. 7A–C, 8A–C, and 9 can be used. Any of these structures, be they 1-D, 2-D, periodic, and or random, have a larger surface area than an unpatterned surface. Therefore, by increasing the surface area of the interface between the two materials, one increases the bond between said two materials. If the two materials have indices of refraction that are similar (e.g., within 0.06), then the surface structures required for adhesion promotion do not require sub-wavelength features, but instead can be features that are significantly larger than the wavelength of operation of the HDSS, and therefore easier to manufacture. For the case of two materials within a holographic media that require good adhesion and which have indices of refraction of sufficient difference as to require some means of suppressing Fresnel reflections, the ARS surfaces described in FIGS. 3–9 can serve this dual purpose of suppressing Fresnel reflections and adhesion promotion.

The surface structures and the fabrication methods described earlier are examples of structures that can be designed for AR applications and/or adhesion promotion applications, and methods in which a surface can be patterned with structures that are on the order of or smaller than the wavelength of application. Other methods of fabricating the structured surfaces may be used depending the material the structured surface is to be applied to, specifications for the structure in accordance with the operational parameters of the HDSS, or the environmental requirements for such a structure (e.g., temperature sensitivity). Thus, different surface-relief structures can be designed that exhibit AR characteristics and/or promote adhesion.

Although the ARS surfaces are described as alternatives to the use of AR coatings on the media, when such structured surfaces are used along an interior surface of the media with or without an ARS surface for reducing reflectivity, AR coatings may also be applied upon the media.

From the foregoing description it will be apparent that there has been provided holographic data storage media having one or more structured surfaces, and methods for providing such media. The illustrated description as a whole is to be taken as illustrative and not as limiting of the scope of the invention. Such variations, modifications and extensions, which are within the scope of the invention, will undoubtedly become apparent to those skilled in the art.

The invention claimed is:

1. Media for holographic data storage having photosensitive material for storing holographic data, and one or more surfaces along the outside of said media, or within the media when said media has one or more substrates which adjoin or encapsulate said photosensitive material, said media comprising:
   surface structures providing a pattern along one or more of said surfaces of the media which are capable of minimizing Fresnel reflections.

2. The holographic media according to claim 1 wherein said structures for minimizing reflections represent a grating pattern of subwavelength structures in accordance with characteristics of illumination when incident said media.

3. The holographic media according to claim 2 wherein said characteristics comprises at least wavelength or wavelengths of the illumination.

4. The holographic media according to claim 2 wherein said characteristics comprise one or more of wavelength, spectral bandwidth, angular bandwidth, and polarization of the illumination.

5. The holographic media according to claim 1 wherein said structures represent a grating pattern.

6. The holographic media according to claim 1 wherein said structures are shaped the same or approximately one or more of sinusoidal, triangular, staircase, moth eye, pyramidal, lamellar, or binary profiles.

7. The holographic media according to claim 1 wherein said structures are one-dimensional or two-dimensional and extend at depths along a third dimension.

8. The holographic media according to claim 1 wherein said pattern of said structures is periodic in at least one dimension.

9. The holographic media according to claim 1 wherein said pattern of said structures is random in at least one dimension.

10. The holographic media according to claim 1 wherein said one or more surfaces having said structures for minimizing reflection are formed in materials having an index of refraction substantially different from material or gas facing said structures.

11. The holographic media according to claim 1 further comprising:
    a material upon one or more of said substrates when present in said media that provides at least one of said surfaces along the outside of said media, and said surface has said structures for minimizing reflections.

12. The holographic media according to claim 1 wherein at least one of said surfaces having said structures are provided on the surface of said photosensitive material.

13. The holographic media according to claim 1 wherein when one or more of said substrates are present said structures are provided on at least the surface of one of said substrates.

14. The holographic media according to claim 1 wherein said reflections are minimized by said structures for illumination over a range of angles of incidence.

15. The holographic media according to claim 1 wherein said reflections are minimized by said structures at least in accordance with polarization of illumination when incident said structures.

16. The holographic media according to claim 1 wherein one or more surfaces having said structures is of a material capable of being molded to form said structures.

17. The holographic media according to claim 16 wherein said material is one of polycarbonate, polyolefin, acrylate, or polymethylmethacrylate.

18. A holographic media for storing holographic data comprising:
    two or more materials each having a surface in an adjoining relationship; and
    the surface of at least one of said materials has surface structures which promotes the adhesion to the surface of the other material in said adjoining relationship, wherein said structures have anti-reflection properties.

19. The holographic media according to claim 18 wherein said structures are same or approximately at least one of sinusoidal, triangular, staircase, pyramidal, moth eye, lamellar, random, or binary structures.

20. The holographic media according to claim 18 wherein said structures are one-dimensional or two-dimensional and extend at depths along a third dimension.

21. The holographic media according to claim 18 wherein said structures represent a grating.

22. A method for providing holographic media for storing holographic data having one or more structured surfaces having anti-reflective properties, said method comprising the steps of:
    providing photosensitive material capable of recording holographic data;
    providing a substrate on either side of said photosensitive material; and
    forming surface structures along at least one surface of one or both of said substrates, or said photosensitive material, for minimizing Fresnel reflections.

23. A method for minimizing reflections from incident illumination in holographic data storage media when operated upon by optical data storage systems, said method comprising the steps of:
    providing at least one surface on or within said media having a grating pattern which minimizes Fresnel reflections occurring when said media is operated upon by the optical data storage system.

24. Media for use in an optical data storage system comprising:
    at least one surface on or within said media having a grating pattern which minimizes Fresnel reflections occurring when said media is operated upon by the optical data storage system.

25. The media according to claim 24 wherein said structures are shaped the same or approximately at least one of sinusoidal, triangular, staircase, moth eye, pyramidal, lamellar, random, or binary profiles.

26. The media according to claim 24 wherein said structures are one-dimensional or two-dimensional and extend at depths along a third dimension.

27. The media according to claim 24 wherein said grating pattern is on at least a surface within said media and promotes adhesion between materials within said media.

28. The holographic media according to claim 1 wherein said reflections are minimized by said structures which are capable of achieving reflection of less than 0.5% depending on angle of illumination incident said structures.

29. The holographic media according to claim 15 wherein said polarization is one of TE, TM, or both TE and TM, and said structures achieve a reflectivity of less than 0.5%.

30. The holographic media according to claim 16 wherein said material is of a cyclic olefin copolymer.

31. The holographic media according to claim 16 wherein said material is of polymeric material.

32. A method for minimizing reflections from illumination in holographic data storage media when operated upon by optical data storage systems, said method comprising the steps of:
providing at least one surface on or within said media having a grating pattern which minimizes Fresnel reflections for incident or reflected illumination occurring when said media is operated upon by the optical data storage system.

33. Media for use in an optical data storage system comprising:
at least one surface on or within said media having one or more surface structures which minimize Fresnel reflections occurring when said media is operated upon by the optical data storage system.

34. The media according to claim 33 wherein said one or more structures represent a pattern of subwavelength structures in accordance with characteristics of illumination when incident said media.

35. A holographic media for storing holographic data comprising:
two or more materials in an adjoining relationship; and
a surface of at least one of said materials has one or more structures having anti-reflection properties.

36. The holographic media according to claim 35 wherein said structures represent a pattern of subwavelength structures in accordance with characteristics of illumination when incident said media.

37. The holographic media according to claim 35 wherein said structures are shaped the same or approximately one or more of sinusoidal, triangular, staircase, moth eye, pyramidal, lamellar, or binary profiles.

38. The holographic media according to claim 35 wherein said structures are one-dimensional or two-dimensional and extend at depths along a third dimension.

39. The holographic media according to claim 35 wherein said structures are periodic in at least one dimension.

40. The holographic media according to claim 35 wherein said structures are random in at least one dimension.

\* \* \* \* \*